United States Patent [19]

Pimpinella et al.

[11] Patent Number: 4,995,695
[45] Date of Patent: Feb. 26, 1991

[54] OPTICAL ASSEMBLY COMPRISING OPTICAL FIBER COUPLING MEANS

[75] Inventors: Richard J. Pimpinella, Hampton; John M. Segelken, Morristown; King L. Tai, Berkeley Heights; Ross J. Thompson, Budd Lake, all of N.J.

[73] Assignee: AT&T Bell Laboratories, Murray Hill, N.J.

[21] Appl. No.: 394,911

[22] Filed: Aug. 17, 1989

[51] Int. Cl.⁵ .......................... G02B 6/36; G02B 7/26
[52] U.S. Cl. ............................ 350/96.20; 350/96.17; 350/96.18
[58] Field of Search ............... 350/96.17, 96.18, 96.20, 350/96.21

[56] References Cited

U.S. PATENT DOCUMENTS

| | | | |
|---|---|---|---|
| 3,949,318 | 4/1976 | Zeidler | 350/96.17 |
| 4,119,363 | 10/1978 | Camlibel et al. | 350/96.20 |
| 4,186,998 | 2/1980 | Holzman | 350/96.17 |
| 4,222,629 | 9/1980 | Dassele et al. | 350/96.20 |
| 4,307,935 | 12/1981 | Monnier | 350/96.17 |
| 4,326,771 | 4/1982 | Henry et al. | 350/96.17 |
| 4,719,358 | 1/1988 | Matsumoto et al. | 250/551 |
| 4,779,946 | 10/1988 | Pimpinella et al. | 350/96.20 |
| 4,822,129 | 4/1989 | Webb | 350/96.18 |
| 4,826,272 | 5/1989 | Pimpinella et al. | 350/96.20 |
| 4,836,633 | 6/1989 | Morgan et al. | 350/96.18 |
| 4,840,450 | 6/1989 | Jones et al. | 350/96.18 |
| 4,844,580 | 7/1989 | Lynch et al. | 350/96.18 |
| 4,875,750 | 10/1989 | Spaeth et al. | 350/96.18 |

Primary Examiner—John D. Lee
Assistant Examiner—Robert E. Wise
Attorney, Agent, or Firm—Eugen E. Pacher

[57] ABSTRACT

Disclosed is a novel "hermetic" optical assembly. A radiation-transmissive member seals an aperture in the assembly housing. The member comprises two major surfaces and a recess that extends from one surface towards the other, with a "septum" between the bottom of the recess and the other surface. An optical or optoelectronic device typically is mounted on the inside surface of the member, and the end of an optical fiber is maintained outside of the assembly in coupling relationship with the device. In a currently preferred embodiment the recess extends from the outward-facing surface of the member and serves to position the end of the optical fiber with respect to a device mounted in a "well" in the inward-facing surface of the member. In another embodiment, the outward facing surface of the member comprises geometrical features (e.g., recesses) that mate with corresponding features (e.g., protrusions) on a guide plate that serves to position the ends of a multiplicity of fibers with respect to devices mounted on the bottom of a recess extending from the inward-facing surface of the radiation-transmissive member. In all embodiments radiation is transmitted through the septum. In preferred embodiments the radiation-transmissive member is (100) Si, with the recess (and other features) produced by means comprising photolithography and anisotropic etching.

16 Claims, 5 Drawing Sheets

OPTICAL ASSEMBLY COMPRISING OPTICAL FIBER COUPLING MEANS

FIELD OF THE INVENTION

This invention pertains to optical connector assemblies, and more particularly, to sealed optical assemblies comprising means for coupling an optical fiber signal-transmissively to an optical or opto-electronic device within the assembly.

BACKGROUND OF THE INVENTION

Apparatus that comprises an optical assembly [we intend "optical assembly" to include assemblies that comprise opto-electronic elements such as optical radiation detectors (e.g., PIN diodes), or optical sources (e.g., LEDs or laser diodes), assemblies that comprise only purely optical elements, as well as assemblies that comprise optical and opto-electronic elements], finds use in many important fields of technology, e.g., in optical communications, and is expected to find even wider use in the future, e.g., in optical computing. In many of these fields reliability of the optical assembly is of utmost importance. One known technique for achieving high reliability comprises placement of the optical and/or electro-optical components into a controlled environment, namely, into a sealed housing. This application deals with sealed optical assemblies comprising means for coupling an optical fiber to an optical or opto-electronic device.

Sealed optical assemblies of the relevant type are well known to the art. However, such prior art assemblies generally have one or more shortcomings. Among these shortcomings are complex design and/or assembly, relatively high cost, limited flexibility with regard to product code changes, a relatively high number of critical (i.e., leak-tight) seals, need for metalized fiber, use of precision-machined parts, and need for active alignment of the device relative to the fiber.

For instance, in one type of sealed assembly, exemplified by U.S. Pat. No. 4,119,363, the fiber (frequently a metal-coated fiber) is threaded through a metal tube, a solder seal is formed between the fiber and the tube, the tube is inserted into a metal housing and soldered thereto, after active alignment of the fiber to a device within the housing. It will be noticed that such an assembly comprises two critical seals, namely, the solder joint between the tube and the housing, and the solder joint between the tube and the optical fiber. The reliability of the latter joint typically is highest if the fiber is metalized. Such metalization however is relatively costly, and frequently results in reduced fiber strength. Another example of this type of sealed assembly can be found in U.S. Pat. No. 4,719,358.

A second type of sealed assembly is exemplified by U.S. Pat. No. 4,222,629. In this type of assembly the fiber is not brought inside the sealed assembly, and thus the need of forming a leak-thigh seal between fiber and another member is eliminated. The '629 patent discloses a precision member that is soldered into an aperture in the assembly housing and which receives a mating body with the fiber therein. A transparent face plate is soldered into the end face of the precision member, such that light from the fiber is transmitted through the face plate and can be detected by a detector inside the sealed assembly. The detector is actively aligned with respect to the fiber. The connector of the '629 patent comprises a precision machined part which determines all critical alignment dimensions, and two critical seals, namely, the joint between the precision member and the assembly housing, and that between the face plate and the end face of the precision member. Furthermore, the design requires active alignment, namely, visual positioning of the device with respect to the fiber.

In view of the commercial significance of sealed optical assemblies, it would by highly desirable to have available an assembly that can have a smaller number of critical seals than do prior art assemblies, that does not require a precision machined member for coupling the fiber to the assembly, that does not require metalized fiber, and the optionally can be assembled without active alignment of the fiber relative to a device within the housing of the assembly. This application discloses assemblies having one or more of these characteristics.

DEFINITIONS AND GLOSSARY

By "optical" radiation we means herein radiation of wavelength that can be transmitted through optical fiber. Currently this wavelength comprises the range from about 0.4 $\mu$m to about 2 $\mu$m, with the range 0.8–1.6 $\mu$m being most useful. However, it is expected that the range will be extended both at the short and the long wavelength end.

"Optical devices" are devices that operate on, or in response to, "optical" radiation and do not have an electrical input of output.

"Opto-electronic devices" are devices that emit, or respond to, "optical" radiation and have an electrical input or output.

A member is a "radiation-transmissive" member herein if at least a portion of the member is relatively transmissive for a given wavelength of the "optical" radiation, where by "relatively transmissive" is meant that a useful fraction of the radiation power incident on the transmissive portion of the member is transmitted therethrough. In some applications 50% may constitute a "useful" fraction, but in communications applications it is typically necessary that the total insertion loss associated with the transmissive member be substantially less than 3 db.

SUMMARY OF THE INVENTION

Disclosed is a novel optical assembly that comprises advantageous means for optically coupling the fiber to an optical or opto-electronic device (herein collectively "device"). The optical assembly overcomes many of the problems associated with the prior art. For instance, the inventive assembly can have fewer critical seals than prior art assemblies, and thus be less prone to failure due to leakage. Furthermore, the inventive assembly need not comprise any precision machined parts, resulting typically in lower cost. Still furthermore, the inventive assembly frequently does not require active alignment of the device with respect to the fiber, as typically is the case in prior art assemblies.

These and other advantages are obtained, inter alia, through the use of a radiation-transmissive member of novel geometry. The member can be made from a variety of materials, including, for instance, semiconductors, quartz or glass. In currently preferred embodiments the member is a Si body that can be produced with high accuracy by standard semiconductor processing techniques. The member serves to seal an aperture in the housing of the optical assembly, the seal between the member and the housing typically being the only critical seal associated with the means for coupling the fiber to the device. By a "critical" seal we mean a joint which has to be leak-tight to within predetermined limits the yield a "hermetic" optical assembly.

More particularly, the inventive optical assembly comprises a housing with at least one aperture therein, at least one device inside the housing, and optical fiber connector means adapted for sealing the aperture, for receiving the end of an optical fiber, and for maintaining the end of the fiber in optical coupling relationship with respect to the device. The connector means comprise the radiation-transmissive member. The optical fiber does not extend into the housing but terminates at or spaced from the outwardly-facing side of the radiation-transmissive member.

The radiation transmissive member is secured to the housing such that the member seals the aperture in the housing. The member gas a first surface and a second surface, at least part of the second surface preferably being substantially parallel with the first, with the first surface outwardly with respect to the housing. In a first embodiment the member comprises a first recess that extends from the fist surface part way to the second surface, leaving a "septum" of material between the bottom of the recess and the second surface. In that embodiment the device typically is mounted on the second surface of the member in predetermined relationship with regard to the recess, but could be formed, also in predetermined relationship with regard to the recess in the member, by known semiconductor processing techniques. Both these possibilities are contemplated if the phrase "the device is on the second surface of the member", or its equivalent is used herein.

In a second embodiment the member comprises a recess that extends from the second surface part way to the first surface, leaving a "septum" of material between the bottom of the recess and the first surface. The device typically is mounted on the bottom of the recess.

The connector means also comprise means for maintaining the end of the optical fiber in optical coupling relationship with the device, with the radiation to be transmitted between fiber and device through the septum. In the first embodiment these means for maintaining the fiber in coupling relationship comprise the recess in the radiation-transmissive member, which recess, inter alia, defines a reference position on the member. In the second embodiment these means comprise geometrical features on or in the first surface of the member.

In one exemplary first embodiment the end of the optical fiber is directly inserted into the recess in the radiation-transmissive member. In other exemplary first embodiments a focusing means, e.g., a spherical lens, is inserted into the recess, or maintained in fixed relationship relative to the recess, and the end of the optical fiber is maintained in predetermined position relative to the focusing means by appropriate means. The latter embodiments can take the form of a disconnectable connector, resulting in a sealed optical assembly to which fiber can be connected easily and quickly.

Exemplary second embodiments of the invention comprise multifiber connecting means using a radiation-transmissive member that either contains a multiplicity of recesses or a recess adapted for accommodating a multiplicity of devices. The fiber ends can abut against the first surface of the member, or focusing means can be interposed between the fiber ends and the surface.

BRIEF DESCRIPTION OF THE DRAWING

No attempt has been made to depict true sizes or proportions. Like features are designated by like numerals in different Figures.

DETAILED DESCRIPTION OF SOME PREFERRED EMBODIMENTS

Common to optical assemblies according to the invention is the use of a novel radiation-transmissive member. The member seals an aperture in the housing of the assembly and comprises at least one recess that extends part way through the member, providing in some embodiments a reference feature that helps to position the fiber and the associated device in coupling relationship. Although the invention is not limited, the discussion below will generally be in terms of Si members.

Exemplarily the comprises features of "optical micro-assemblies" (OMAs) of the type disclosed in U.S. Pat. Nos. 4,779,946 and 4,826,272 (both incorporated herein by reference), with one crucial difference. Whereas prior art OMAs comprise a through-aperture that extends from a first to a second surface of the OMA, the inventive radiation-transmissive member does not have a through-aperture. Instead the member comprises at least one recess that extends from one of the surfaces towards the other one, leaving a septum of material between the bottom of the recess and the other surface. In the previously referred to first and second embodiments of the invention the recess extends, respectively, from the fist towards the second surface, and from the second towards the first surface.

When the member is a Si member, then it can readily be produced by known semiconductor processing techniques, optionally including the batch testing and/or burn-in techniques disclosed in U.S. patent application Ser. No. 353,264, filed May 17, 1989 for R. J. Pimpinella and J. M. Segelken and titled "Method of Manufacturing Optical Assemblies", incorporated herein by reference.

Figure 1:
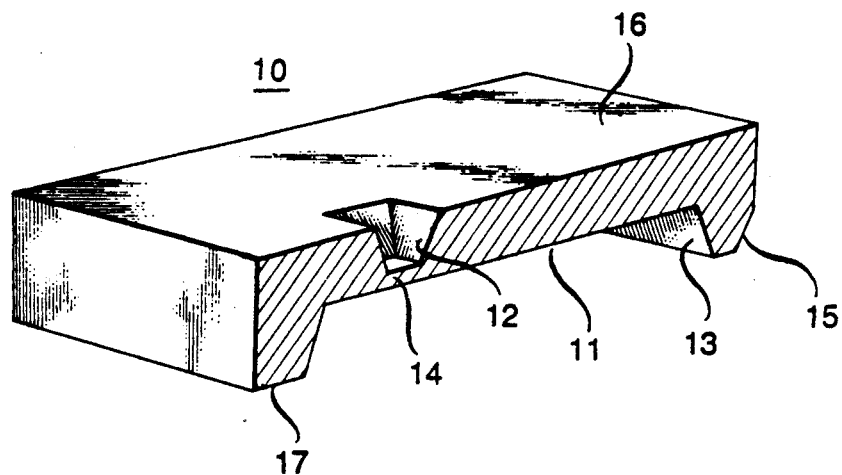
FIG. 1 schematically depicts an exemplary radiation-transmissive member.

FIG. 1 schematically depicts an exemplary radiation-transmissive member 10 according to the invention. Unless otherwise noted, the following discussion is in terms of appropriate for the first embodiment of the invention. The member has first and second surfaces 16 and 17, respectively, with 17 comprising a "well" 11 and side-walls 13. Recess 12 extends from 16 toward 17, with septum 14 forming the bottom of the recess. Generally, the thickness of the septum is not critical, provided that the septum has enough mechanical strength to withstand the anticipated pressure differential between the inside of the assembly and the ambient. Exemplarily, the thickness is in the range of 20–60 μm. The recess is shown with sloping side-walls. This feature is optional, as is the presence of bevel 15. Furthermore, the presence of the well is optional. However, some currently preferred embodiments of the invention comprise a Si radiation-transmissive member having a geometry substantially as depicted schematically in FIG. 1.

Figure 2:
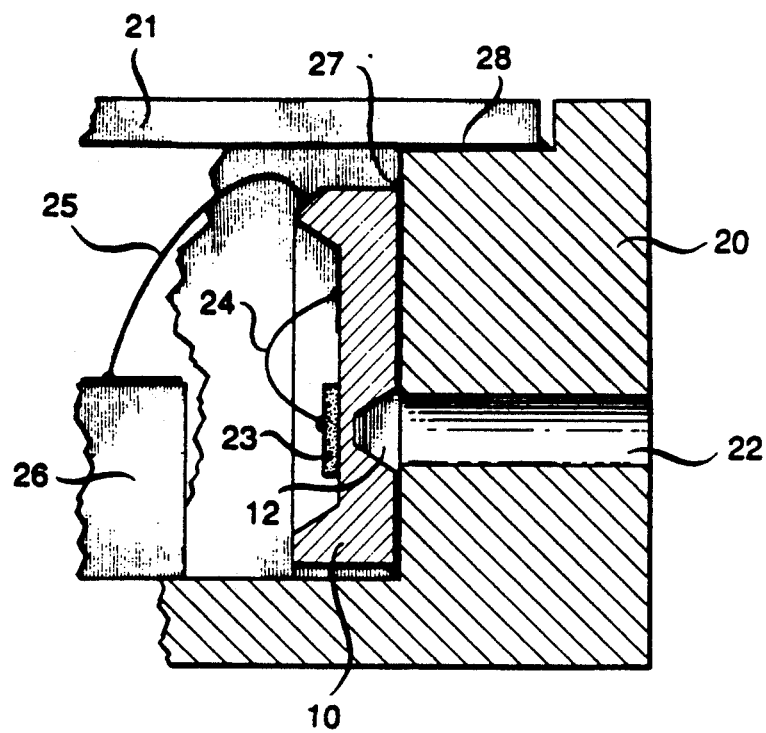
FIGS. 2 and 3 shown schematically portions of exemplary optical assemblies according to the invention.
Figure 3:
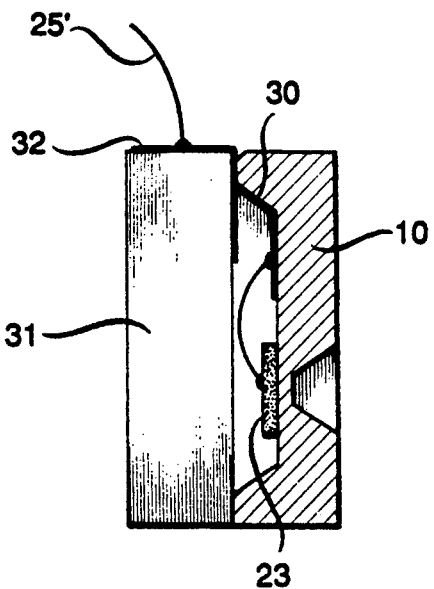

FIG. 2 schematically shows a portion of an exemplary inventive assembly. The assembly housing comprises a first member 20 and a second member 21, with 21 to be hermetically sealed to 20, typically at the end of the assembly process, exemplarily be means of conventional solder 28. The housing can be metal, ceramic, or any other appropriate material. The side wall of 20 comprises a fiber access aperture 22, and radiation-transmissive member 10 sealingly covers 22, with recess 12 facing outwardly and being concentric with 22. Typically member 10 is to the side wall of 20. Concentricity can be achieved by any appropriate technique, exemplarily by means of a hot "finger" that is inserted through 22 and which both heats and positions member 10. Lowering the temperature of the hot finger results in freezing of solder 27, with the member in appropriate position relative to fiber access aperture 22.

Although not a requirement, device 23 (exemplarily a laser, LED, or detector) advantageously is mounted on the second surface of member 10 prior to the latter's attachment to the housing. In any case, the device is positioned in predetermined position relative to recess 12, exemplarily utilizing alignment marks on the second surface of the member, as described in the '272 patent. Electrical connections are established between device 23 and conductor means (not all shown) on member 10. Exemplarily, such contact between the back side of the device and an appropriate conductor pad is established by means of conventional wire bond 24. Similarly, wire bond 25 provides electrical connection between conductor means on the bevel of member 10 with a connector pad on circuit board, AVP-type Si substrate, or ceramic HIC 26.

A further exemplary embodiment is shown in FIG. 2, wherein contact block 31 has a conductor pattern 32 thereon, such that electrical contact can be established between 32 and conductor means 30 on member 10, e.g., by means of solder. Wirebond 25' provides electrical access to device 23.

Those skilled in the art will understand that electrical contact typically has to be made also to the front face of device 23, and will know techniques for doing so. See, for instance, the '946 and '272 patents. Exemplarily, the inward-facing surface of the radiation-transmissive member carries an appropriate conductor pattern, the front face of the device is appropriately metalized, and a conductive connection between the conductor pattern and the metalization is established by means of solder.

In currently preferred embodiments member 10 is a (100) oriented single crystal Si body that is produced by known techniques. In this case, well 11 and recess 12 both advantageously are produced by anisotropic etching. Although the recess advantageously has a flat bottom this is not a requirement. Both pyramid-shape and truncated pyramid-shape recesses can readily be produced by anisotropic etching of Si or other semiconductors, as is well known to those skilled in the art. However, radiation-transmissive members need not consist of semiconductor material, and in other materials (e.g., glass) the recess may advantageously be of truncated cone or other "circular" shape.

Although not an absolute requirement, it is advantageous to use anti-reflection (AR) coated radiation-transmissive members. For instance, if the member is a Si member the, due to the relatively high refractive index of Si (n ~ 3.5), the reflection loss at each air/Si interface would be about 30% at both 1.3 and 1.55 μm. Since there are 2 air/Si interfaces, an inventive assembly without AR coating might introduce a loss of more than 3 db. On the other hand, by using an AR-coated member (exemplarily, 0.17 μm thick cubic Zirconia films on both sides of the septum) it has been possible to produce connector assemblies that had substantially lower insertion loss, in preferred embodiments less than 0.1 db. AR coatings, including a technique for determining the appropriate thickness for given coating material, for selecting an appropriate coating material, and for depositing the coatings, are well known to those skilled in the art.

Figure 4:
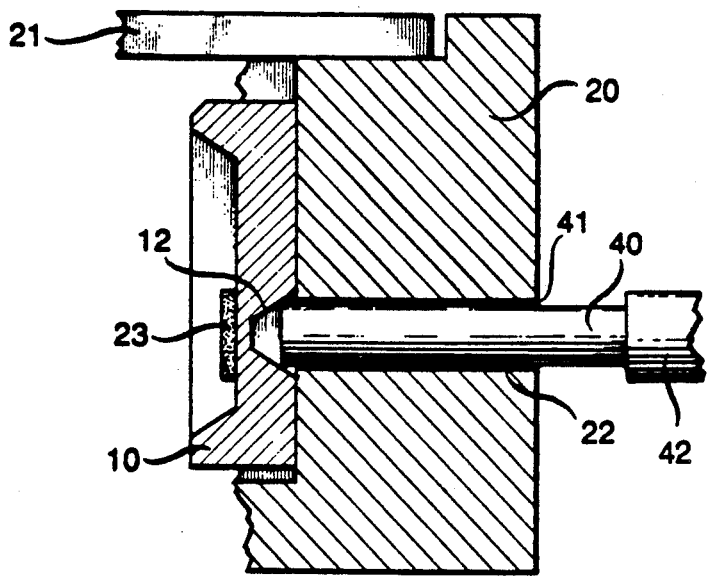
FIGS. 4, 5, and 6 depict schematically portions of exemplary optical assemblies with optical fibers attached thereto.

A shown in FIG. 4, a fiber 40 can be inserted through access hole 22, advanced until the end of the fiber rests against the side walls of recess 12, and fixed in this position by appropriate means, e.g., by adhesive means 41. It will be noted that this fiber attachment can be carried out after the assembly has been sealed, and could even be carried out in the field. This feature of the inventive assembly makes it easy to switch between manufacturing codes that call for different lengths of fiber. It will also be noted that the bond between the fiber and the walls of the access hole need not be hermetic. Typically, fibers carry a polymer coating 42 which can be, but need not be, removed from a portion of the fiber prior to insertion of the fiber into the hole. Typically a connector assembly comprises strain relief means. Such means are conventional and are not shown in the figures.

Figure 5:
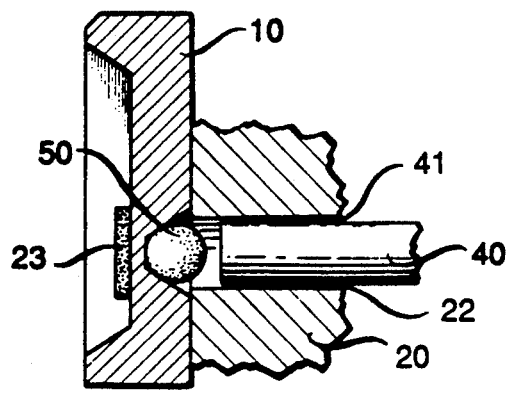

A further exemplary embodiment is schematically depicted in FIG. 5, wherein lens 50 is held in the recess by appropriate means (e.g., adhesive means) that are not shown, with the curvature and refractive index of the lens, as well as the distances between the lens and the device 23, and the end of the fiber 41 and the lens, selected such that the lens focuses the light from the fiber onto the device, or focuses light emitted from the device onto the fiber, as the case may be. Lenses appropriate for this use are known in the art. Exemplarily, lens 50 is a sapphire sphere.

Figure 6:
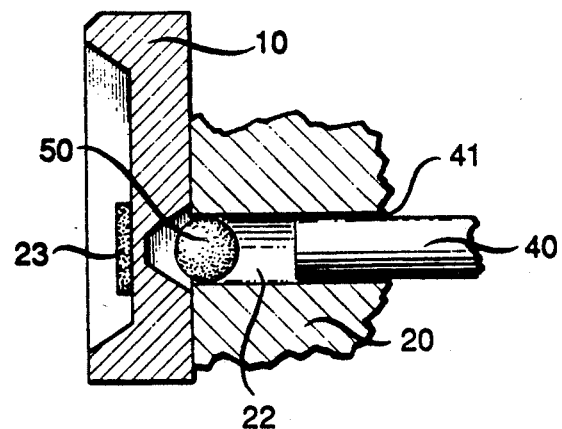

A still further embodiment is schematically shown in FIG. 6, wherein spherical lens 50 is held by appropriate means (e.g., a press fit) in access hole 22, with the distances and optical properties chosen such that appropriate focusing takes place.

Figure 7:
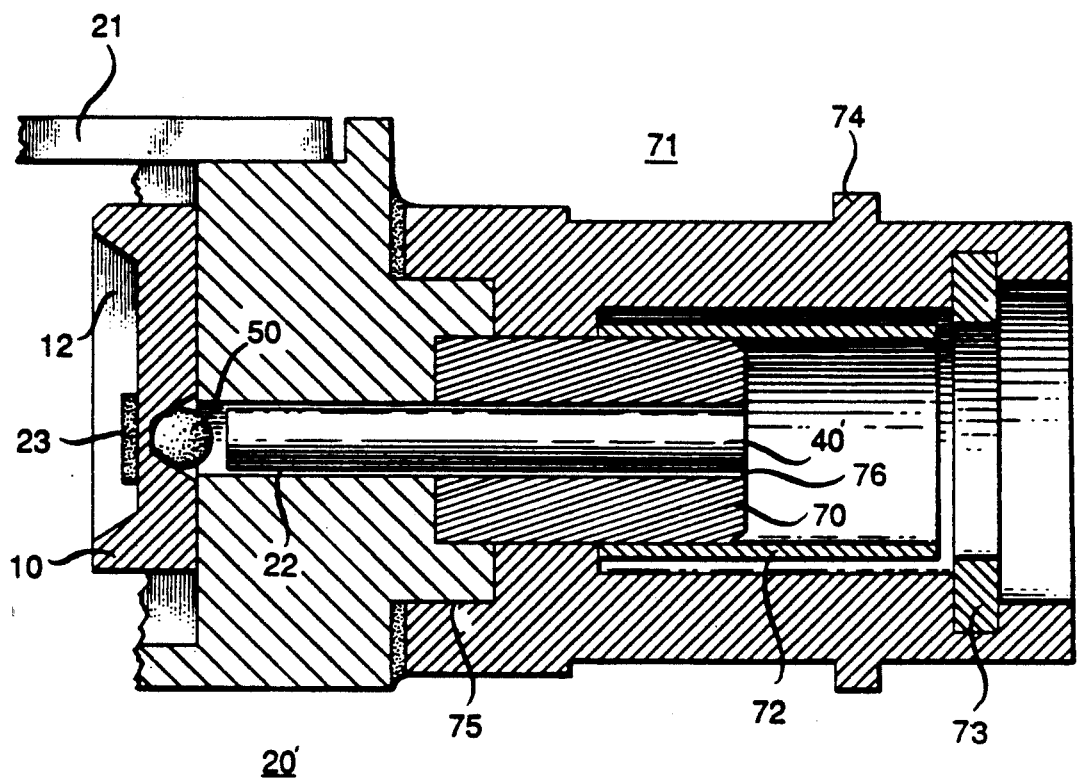
FIG. 7 schematically depicts a part of an exemplary optical assembly with fiber coupling means.

The inventive assembly can not only be provided with a fiber "pig-tail" but can also be connectorized such that a fiber can be easily coupled to the assembly. FIG. 7 schematically depicts an exemplary connectorized assembly. The connector portion of the assembly is similar to a connector disclosed, for instance, in U.S. patent application Ser. No. 314,683, incorporated herein by reference. The mating connector part can be substantially as depicted in FIG. 5 of the '683 application and is now shown.

FIG. 7 shows an assembly that comprises a housing part 20' similar to part 20 of FIG. 2, comprising a stub 75 which mates with connector housing 71. Stub 75 also comprises a recessed portion which receives connector "plug" 70, exemplarily a ceramic capillary cylinder. A length of optical fiber 40' is inserted through the capillary bore 76 or 70 into access hole 22 and secured therein. The excess fiber is then removed and the plug endface polished, all in known manner. Connector housing 71 is then slipped onto stub 75 and attached thereto, e.g., by soldering. Finally, alignment sleeve 72 is placed over the plug and secured axially by means of retainer ring 73. Connector housing 71 also comprises means 74 for engaging an opposing connector housing (not shown), exemplarily by means of a twist-and-lock type arrangement. Such means are well known in the connector art. Briefly, the opposing connector terminal comprises a plug similar to plug 70 that fits into sleeve 72 and is held radially aligned thereby. Typically the terminal comprises spring means that urge the terminal plug towards plug 70 such that the two opposing plug end faces are held in contacting relationships, with the fibers in the respective plugs being in signal-transmissive relationship.

Figure 8:
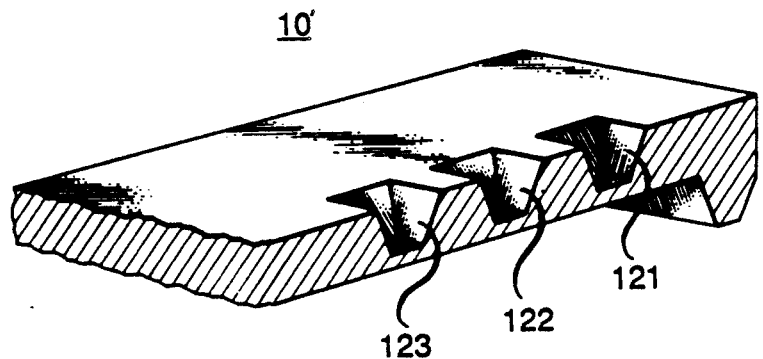
FIG. 8 shows schematically a portion of an exemplary multi-recess member according to the first embodiment of the invention.

So far, the discussion has primarily been in terms of single-fiber assemblies. However, the invention is not limited. For instance, as schematically depicted in FIG. 8, the radiation-transmissive member 10', could be similar to member 10 but have a multiplicity of recesses 12, (i=1,2, . . . n) with housing 20 having a corresponding multiplicity of appropriately placed access apertures.

Devices are mounted on the inward-facing side of the respective septa, and electrical contact established thereto, all substantially as discussed in reference to a single-fiber assembly. The multi-recess member is then attached to the assembly housing so as to seal the aperture therein, fibers are inserted through the access apertures and affixed thereto in optical coupling relationship with the respective device, all substantially as discussed.

Figure 9:
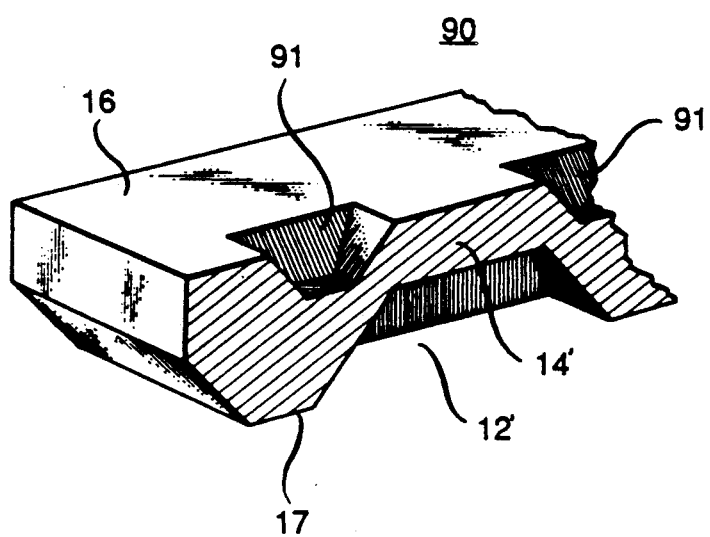
FIG. 9 depicts schematically a portion of an exemplary radiation-transmissive member of a multi-fiber connector according to the second embodiment of the invention.

The following discussion, unless noted otherwise, pertains to the previously referred-to second embodiment of the invention. FIG. 9 shows radiation-transmissive member 90 having first and second surfaces 16 and 17, respectively. Recess 12 extends from the second towards the first surface, with septum 14 between the bottom of the recess and the first surface. The member also comprises geometrical features, exemplified by indentations 91, that serve to maintain an opposing member in appropriate relationship with respect to recess 12. A device typically is mounted in the recess. It will be appreciated that member 90 can comprise a multiplicity of recesses, or that a recess can be dimensioned such that it can accommodate a multiplicity of devices. It will also be appreciated that member 90 typically will comprise a multiplicity of indentations (or other geometrical features), and that these features can be arranged in any desired fashion. In a currently preferred embodiment member 90 is a (100)-oriented Si member, the recess (or recesses) and the indentations are formed by anisotropic etching in known manner. Both sides of the septum 14 preferably are antireflection coated.

Figure 10:
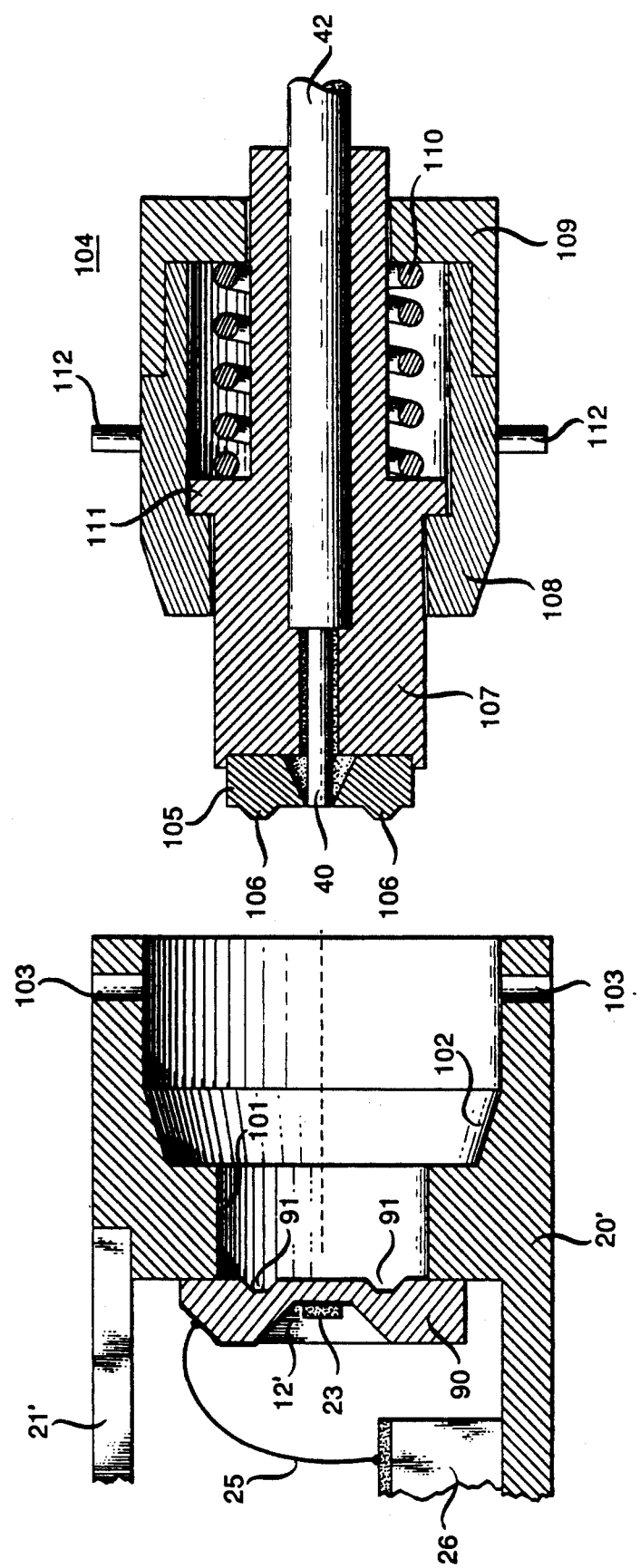
FIG. 10 schematically shows the relevant part of an exemplary optical assembly with fiber coupling means according to the second embodiment of the invention.

FIG. 10 schematically depicts the relevant portion of an exemplary inventive assembly according to the second embodiment. The assembly housing comprises first and second members 20' and 21', substantially as described in connection with FIG. 2. The first member comprises plug access opening 101 and plug guide means 102. Radiation-transmissive member 90 is attached to housing member 20' such that device 23 is in predetermined position relative to geometrical features 91. Numeral 103 refers to the female portion of twist-and-lock type (bayonnette) means for securing male connector member 104 to the assembly.

The male connector member comprises a guide member 105 that comprises a through-aperture substantially of the type disclosed in the '946 patent, but that furthermore comprises features that cause the guide member to mate with the geometrical features in (or on) the first surface of member 90. If features 91 are recesses then features 106 are protrusions. However, if desired, member 90 could comprise protrusions and 105 recesses. Other mating features are also possible and are contemplated. The guide member is attached concentrically to tubular member 107, which in turn is held slidingly within housing members 108 and 109. The latter are fastened together by any appropriate means, e.g., thread means. Spring means 110 surround a portion of tubular members 107 and urge the member formed. Lip 111 limits the forward motion of 107. Coated fiber 42 is inserted into 107, with a length of bare fiber 40 extending into the through-aperture of 105 and positioned thereby with regard to protrusions 106. Stubs 112 are used to secure 104 to the mating housing assembly.

It will be appreciated that FIG. 10 is exemplary only, and that other embodiments of the invention are possible. For instance, the assembly of FIG. 10 can readily be modified to yield a multi-fiber connector. In that case, the recess 12' advantageously in trough-like, with fiduciary marks or other means provided to permit appropriate placement of devices on the bottom of the recess. Guide member 105 in that case comprises a plurality of through-apertures, all positioned and dimensioned to result in coupling between the fibers and the corresponding devices.

Although not an absolute requirement, "female" member 90 and "male" member 105 advantageously are fabricated from single crystal (100) Si wafers by a method that comprises standard photolithography and anisotropic etching, substantially as described in the '946 and '272 patents. In that case, the sides of the protrusions, the side walls of the through-apertures, and the side walls of the recess in the female member will all have the same (crystallographically defined) angle (54.74 degrees) with respect to the (100) plane. The through-aperture can be dimensioned such that the optical fiber comes to rest against the side wall of the aperture or such that the fiber can just clear the opening. In the latter case the fiber typically would be scribed and cleaved.

The through-apertures (and corresponding devices) need not be placed in a linear array. For instance, for some applications it may be advantageous to arrange the apertures in two or more parallel linear arrays, with neighboring arrays offset by half the (common) spacing between two neighboring apertures in an array. Such an arrangement lends itself to coupling multiple fiber ribbons to an optical assembly. Exemplarily, a commercially available fiber ribbon cable contains two or more fiber ribbons, each ribbon typically containing 12 equally spaced fibers. Optionally grooved guide plates could be placed between adjacent fiber ribbon ends, to facilitate simultaneous insertion of all the fiber ends into the respective through apertures of an appropriate male member.

The above described multi-fiber connector means are not limited to use in assemblies according to the invention (i.e., comprising a radiation-transmissive female member), but could, with minor modifications, also be used in fiber-to-fiber connector means in which the female member also comprises through-apertures.

Although the figures herein show cleaved fibers, lensed fibers can be used also, as will be appreciated by those skilled in the art. For single mode applications lensed fibers are currently preferred.

We claim:

1. An optical assembly comprising
   (a) a housing having at least one aperture therein;
   (b) at least one optical or elector-optical device (collectively "device") inside the housing; and
   (c) optical fiber connector means adapted for sealing the aperture, for receiving the end of an optical fiber, and for maintaining the end of the fiber in optical coupling relationship with respect to the device;
   the optical fiber connector means comprise a radiation-transmissive member attached to the housing such that it seals the aperture in the housing; wherein the radiation-transmissive member has a first and a second surface, with the first surface facing outwardly of the housing, the radiation-transmissive member comprising a recess that extends from one of the surfaces towards the other surface, leaving a "septum" of material between the bottom of the recess and the other surface; the device being maintained in predetermined position with respect to the recess; the connector means further comprising means for holding the end of the optical coupling relationship with the device, with the radiation to be transmitted through the septum.

2. Assembly according to claim 1, further comprising an antireflection coating on at least one side of the septum.

3. Assembly according to claim 2, wherein the radiation-transmissive member comprises single crystal Si, with the first surface being substantially parallel with a (100) crystal plane.

4. Assembly according to claim 1, wherein the recess extends from the first surface towards the second surface, and the device is mounted on the second surface of the radiation-transmission member.

5. Assembly according to claim 4, wherein the second surface comprises a depression, termed a "well", with the device mounted in the well.

6. Assembly according to claim 4, wherein the means for holding the end of the optical fiber in optical coupling relationship with the device comprise the recess.

7. Assembly according to claim 6, wherein the end of the optical fiber extends into the recess and is positioned thereby with respect to the device.

8. Assembly according to claim 6, wherein focusing means are positioned between the septum and the end of the optical fiber, the focusing means held within the recess.

9. Assembly according to claim 4, wherein focusing means are placed between the septum and the end of the optical fiber.

10. Assembly according to claim 4, wherein the means for holding the end of the optical fiber in coupling relationship with the device comprise
    (i) a first cylindrical "plug" with an axial through-bore therein, the first plug attached to the housing such that the through-bore is essentially co-axial with the aperture in the housing;
    (ii) a length of optical fiber held within the through-bore and extending towards the recess, an end of the length of fiber being in optical coupling relationship with the device;
    (iii) an alignment sleeve substantially surrounding a part of the first plug and extending beyond the first plug; and
    (iv) connector housing means, also attached to the housing, substantially surrounding the first plug and the alignment sleeve, and comprising means for engaging an opposing optical fiber connector means such that an optical fiber in the opposing connector means is in optical coupling relationship with the length of optical fiber.

11. Assembly according to claim 1, wherein the recess extends from the first surface towards the second surface, the radiation-transmissive member is a semiconductor member, and the device is at least in part formed in the material of the semiconductor member.

12. Assembly according to claim 1, wherein the recess extends from the second surface towards the first surface, and the device is mounted on the bottom of the recess.

13. Assembly according to claim 12, wherein the means for holding the end of the optical fiber in optical coupling relationship with the device comprise a first geometrical feature on the first surface of the radiation-transmissive member and a corresponding second geometrical feature on a surface of a guide member, the guide member comprising a through-aperture, the end of the optical fiber held within the through-aperture, the second geometrical feature adapted for mating with the first geometrical feature, whereby the end of the optical fiber is maintained in optical coupling relationship with the device.

14. Assembly according to claim 12, wherein the means for holding the end of the optical fiber in coupling relationship with the device comprise the radiation-transmissive member and a guide member that comprises a first and a second surface and a multiplicity of through-apertures extending between the first and second surfaces of the guide member, each through-aperture adapted for receiving therein an end of an optical fiber, the guide member furthermore comprising at least one protrusion positioned and shaped so as to matingly engage with a corresponding depression in the first surface of the radiation-transmissive member, the guide member also comprising single crystal Si, with a (100) crystal plane being substantially parallel to the first surface of the guide member.

15. Assembly according to claim 14, wherein the recess in the radiation-transmissive member is a trough-like recess having side walls, each side wall being essentially parallel to a (111) crystal plane of the radiation-transmissive member, and wherein the protrusion on the guide member also has side walls that are essentially parallel to a (111) crystal plane of the guide member.

16. Assembly according to claim 14, wherein the radiation-transmissive member comprises a multiplicity of depressions and the guide member comprises a multiplicity of protrusions, with all protrusions adapted to matingly engage with the corresponding depressions.

* * * * *

UNITED STATES PATENT AND TRADEMARK OFFICE
CERTIFICATE OF CORRECTION

PATENT NO. : 4,995,695

DATED : February 26, 1991

INVENTOR(S) : Richard J. Pimpinella, John M. Segelken, King L. Tai, and Ross J. Thompson It is certified that error appears in the above-identified patent and that said Letters Patent is hereby corrected as shown below:

Column 9, line 18, "the optical" should read --CHARACTERIZED IN THAT the optical--. Column 9, line 31, "the optical coupling" should read --the optical fiber in optical coupling--.

Signed and Sealed this

Fourth Day of August, 1992

*Attest:*

DOUGLAS B. COMER

*Attesting Officer*   *Acting Commissioner of Patents and Trademarks*